(12) United States Patent
Cheng (10) Patent No.: US 10,976,613 B1
(45) Date of Patent: Apr. 13, 2021

(54) LIQUID CRYSTAL DISPLAY PANEL AND MANUFACTURING METHOD THEREOF, AND MANUFACTURING SYSTEM

(71) Applicant: WUHAN CHINA STAR OPTOELECTRONICS TECHNOLOGY CO., LTD., Wuhan (CN)

(72) Inventor: Wei Cheng, Wuhan (CN)

( * ) Notice: Subject to any disclaimer, the term of this patent is extended or adjusted under 35 U.S.C. 154(b) by 0 days.

(21) Appl. No.: 16/771,340

(22) PCT Filed: Mar. 17, 2020

(86) PCT No.: PCT/CN2020/079568
§ 371 (c)(1),
(2) Date: Jun. 10, 2020

(51) Int. Cl.
| | | |
|---|---|---|
| *G02F 1/1337* | (2006.01) |
| *G02F 1/1341* | (2006.01) |
| *G02F 1/1335* | (2006.01) |
| *G02F 1/1339* | (2006.01) |

(52) U.S. Cl.
CPC ...... *G02F 1/133711* (2013.01); *G02F 1/1341* (2013.01); *G02F 1/13394* (2013.01); *G02F 1/133528* (2013.01); *G02F 1/133788* (2013.01); *G02F 1/13398* (2021.01); *G02F 2202/023* (2013.01); *G02F 2202/043* (2013.01)

(58) Field of Classification Search
CPC ........... G02F 1/133711; G02F 1/13394; G02F 1/133788; G02F 1/1341; G02F 2202/043; G02F 2202/023
See application file for complete search history.

*Primary Examiner* — Donald L Raleigh (57) ABSTRACT

The present invention provides a liquid crystal display panel and a manufacturing method thereof, and a manufacturing system. The method comprises filling a mixture of liquid crystals, a first polymeric group, a second polymeric group, and a dichroic pigment in a first substrate and a second substrate which are arranged into a cell; and controlling the first polymeric group and one portion of the dichroic pigment to be polymerized to form a first alignment layer and a first polarizing layer, and the second polymeric group and another portion of the dichroic pigment to be polymerized to form a second alignment layer and a second polarizing layer. The present invention omits a coating process.

20 Claims, 3 Drawing Sheets

LIQUID CRYSTAL DISPLAY PANEL AND MANUFACTURING METHOD THEREOF, AND MANUFACTURING SYSTEM

FIELD OF INVENTION

The present disclosure relates to the field of display technology, and more particularly, to a liquid crystal display panel and a manufacturing method thereof, and a manufacturing system.

BACKGROUND OF INVENTION

After a liquid crystal display panel is filled with liquid crystals, the liquid crystals need to be aligned. A current alignment process is coating liquid crystal display panels in polyimide liquid, and performing a pre-baking process, an ultraviolet irradiation process, and a high temperature curing process, etc., to form an alignment film for alignment. The manufacturing process is more complicated, and a high temperature process is not suitable for some products such as quantum dots that need to be manufactured under a low temperature process.

Therefore, current liquid crystal display panels have technical problems of high temperature alignment process and complicated processes, which need to be resolved.

SUMMARY OF INVENTION

The present disclosure provides liquid crystal display panel and a manufacturing method thereof, and a manufacturing system to solve the technical problems of high temperature alignment process and complicated processes.

In order to solve the above problems, technical solutions provided by the present disclosure are as follows:

The present disclosure provides a manufacturing method of a liquid crystal display panel, comprising following steps that providing a first substrate and a second substrate and arranging the first substrate and the second substrate into a cell; filling a mixture of liquid crystals, a first polymeric group, a second polymeric group, and a dichroic pigment between the first substrate and the second substrate; controlling the first polymeric group and one portion of the first dichroic pigment to be polymerized at a side of the first substrate, and the second polymeric group and another portion of the dichroic pigment to be polymerized at a side of the second substrate, wherein an orientation direction of the dichroic pigment in the first polymeric group is perpendicular to an orientation direction of the dichroic pigment in the second polymeric group; and curing the first polymeric group, the second polymeric group, and the dichroic pigment, and sequentially forming a first alignment layer and a first polarizing layer which are laminated at a side of the first substrate near the second substrate, and sequentially forming a second alignment layer and a second polarizing layer which are laminated at a side of the second substrate near the first substrate.

In the manufacturing method of the liquid crystal display panel of the present disclosure, before the step of filling the mixture of liquid crystals, the first polymeric group, the second polymeric group, and the dichroic pigment between the first substrate and the second substrate, the manufacturing method comprises pre-polymerizing an alignment prepolymer and a first liquid crystal group to form the first polymeric group; and pre-polymerizing the alignment prepolymer and a second liquid crystal group to form the second polymeric group.

In the manufacturing method of the liquid crystal display panel of the present disclosure, the step of pre-polymerizing the alignment prepolymer and the first liquid crystal group to form the first polymeric group comprises providing the alignment prepolymer and the first liquid crystal group, wherein the alignment prepolymer comprises an ultraviolet-responding unit and polymerizable double bonds on both sides, and the first liquid crystal group comprises a first liquid crystal core, first flexible spacers on both sides of the first liquid crystal core, and a first active terminal group connected to the first flexible spacers; and pre-polymerizing the polymerizable double bonds with the first active terminal group to form the first polymeric group.

In the manufacturing method of the liquid crystal display panel of the present disclosure, the step of providing the alignment prepolymer and the first liquid crystal group, wherein the alignment prepolymer comprises an ultraviolet-responding unit and polymerizable double bonds on both sides, and the first liquid crystal group comprises the first liquid crystal core, the first flexible spacers on both sides of the first liquid crystal core, and the first active terminal group connected to the first flexible spacers comprises providing the first liquid crystal group having the first active terminal group as an acrylate.

In the manufacturing method of the liquid crystal display panel of the present disclosure, the step of pre-polymerizing the alignment prepolymer and the second liquid crystal group to form the second polymeric group comprises providing the alignment prepolymer and the second liquid crystal group, wherein the alignment prepolymer comprises the ultraviolet-responding unit and the polymerizable double bonds on both sides, and the second liquid crystal group comprises a second liquid crystal core, second flexible spacers on both sides of the second liquid crystal core, and a second active terminal group connected to the second flexible spacers; and pre-polymerizing the polymerizable double bonds with the second active terminal group to form the second polymeric group.

In the manufacturing method of the liquid crystal display panel of the present disclosure, the step of providing the alignment prepolymer and the second liquid crystal group, wherein the alignment prepolymer comprises the ultraviolet-responding unit and the polymerizable double bonds on both sides, and the second liquid crystal group comprises the second liquid crystal core, the second flexible spacers on both sides of the second liquid crystal core, and the second active terminal group connected to the second flexible spacers comprises providing the second liquid crystal group having the second active terminal group as an acrylate.

In the manufacturing method of the liquid crystal display panel of the present disclosure, the step of controlling the first polymeric group and the one portion of the dichroic pigment to be polymerized at the side of the first substrate, and the second polymeric group and the other portion of the dichroic pigment to be polymerized at the side of the second substrate comprises second substrate comprises applying an electric field to the mixture to control the first polymeric group, the second polymeric group, and the dichroic pigment to be polymerized.

In the manufacturing method of the liquid crystal display panel of the present disclosure, the step of curing the first polymeric group, the second polymeric group, and the dichroic pigment, sequentially forming the first alignment layer and the first polarizing layer which are laminated at the side of the first substrate near the second substrate, and sequentially forming the second alignment layer and the second polarizing layer which are laminated at the side of the second substrate near the first substrate comprises heating and irradiating with ultraviolet light on the first polymeric group, the second polymeric group, and the dichroic pigment.

In the manufacturing method of the liquid crystal display panel of the present disclosure, the step of curing the first polymeric group, the second polymeric group, and the dichroic pigment, sequentially forming the first alignment layer and the first polarizing layer which are laminated at the side of the first substrate near the second substrate, and sequentially forming the second alignment layer and the second polarizing layer which are laminated at the side of the second substrate near the first substrate comprises curing the first polymeric group and one portion of the dichroic pigment, so that the first alignment layer is formed by the alignment prepolymer in the first polymeric group, and the first polarizing layer is formed by the first polymeric group and one portion of the dichroic pigment; and curing the second polymeric group and the other portion of the dichroic pigment, so that the second alignment layer is formed by the alignment prepolymer in the second polymeric group, and the second polarizing layer is formed by the second polymeric group and the other portion of the dichroic pigment.

The present disclosure further provides a liquid crystal display panel, and the liquid crystal display panel is manufactured by using any one of the manufacturing methods described above.

The present disclosure further provides a manufacturing system of a liquid crystal display panel, comprising an encasing alignment device used to provide a first substrate and a second substrate and arrange the first substrate and the second substrate into a cell; a mixing device used to fill a mixture of liquid crystals, a first polymeric group, a second polymeric group, and a dichroic pigment between the first substrate and the second substrate; a polymerizing device used to control the first polymeric group and one portion of the dichroic pigment to be polymerized at a side of the first substrate, and the second polymeric group and another portion of the dichroic pigment to be polymerized at a side of the second substrate, wherein an orientation direction of the dichroic pigment in the first polymeric group is perpendicular to an orientation direction of the dichroic pigment in the second polymeric group; and a curing device used to cure the first polymeric group, the second polymeric group, and the dichroic pigment, and sequentially forming a first alignment layer and a first polarizing layer which are laminated at a side of the first substrate near the second substrate, and sequentially forming a second alignment layer and a second polarizing layer which are laminated at a side of the second substrate near the first substrate.

In the manufacturing system of the liquid crystal display panel of the present disclosure, the manufacturing system comprises a first pre-polymerizing device used to pre-polymerize an alignment prepolymer and a first liquid crystal group to form the first polymeric group; and a second pre-polymerizing device used to pre-polymerize the alignment prepolymer and a second liquid crystal group to form the second polymeric group.

In the manufacturing system of the liquid crystal display panel of the present disclosure, the first pre-polymerizing device comprises In the manufacturing system of the liquid crystal display panel of the present disclosure, a first prepolymer providing element used to provide the alignment prepolymer and the first liquid crystal group, wherein the alignment prepolymer comprises an ultraviolet-responding unit and polymerizable double bonds on both sides, and the first liquid crystal group comprises a first liquid crystal core, first flexible spacers on both sides of the first liquid crystal core, and a first active terminal group connected to the first flexible spacers; and a first prepolymer responding element used to pre-polymerize the polymerizable double bonds with the first active terminal group to form the first polymeric group.

In the manufacturing system of the liquid crystal display panel of the present disclosure, the first prepolymer providing element is used to provide the first liquid crystal group having the first active terminal group as an acrylate.

In the manufacturing system of the liquid crystal display panel of the present disclosure, the second pre-polymerizing device comprises a second prepolymer providing element used to provide the alignment prepolymer and the second liquid crystal group, wherein the alignment prepolymer comprises the ultraviolet-responding unit and the polymerizable double bonds on both sides, and the second liquid crystal group comprises a second liquid crystal core, second flexible spacers on both sides of the second liquid crystal core, and a second active terminal group connected to the second flexible spacers; and a second prepolymer responding element used to pre-polymerize the polymerizable double bonds with the second active terminal group to form the second polymeric group.

In the manufacturing system of the liquid crystal display panel of the present disclosure, the second prepolymer providing element is used to provide the second liquid crystal group having the second active terminal group as an acrylate.

In the manufacturing system of the liquid crystal display panel of the present disclosure, the polymerizing device is used to apply an electric field to the mixture to control the first polymeric group, the second polymeric group, and the dichroic pigment to be polymerized.

In the manufacturing system of the liquid crystal display panel of the present disclosure, the polymerizing device is used to apply a voltage to a pixel electrode in the first substrate and a common electrode in the second substrate.

In the manufacturing system of the liquid crystal display panel of the present disclosure, the curing device is used to heat and irradiate with ultraviolet light on the first polymeric group, the second polymeric group, and the dichroic pigment.

In the manufacturing system of the liquid crystal display panel of the present disclosure, the curing device comprises a first curing element used to cure the first polymeric group and the one portion of the dichroic pigment, so that the first alignment layer is formed by the alignment prepolymer in the first polymeric group, and the first polarizing layer is formed by the first polymeric group and the one portion of the dichroic pigment; and a second curing element used to cure the second polymeric group and the other portion of the dichroic pigment, so that the second alignment layer is formed by the alignment prepolymer in the second polymeric group, and the second polarizing layer is formed by the second polymeric group and the other portion of the dichroic pigment.

The present disclosure provides a liquid crystal display panel and a manufacturing method thereof, and a manufacturing system. The method comprises providing a first substrate and a second substrate and arranging the first substrate and the second substrate into a cell; filling a mixture of liquid crystals, a first polymeric group, a second polymeric group, and a dichroic pigment between the first substrate and the second substrate; controlling the first polymeric group and one portion of the dichroic pigment to be polymerized at a side of the first substrate, and the second polymeric group and another portion of the dichroic pigment to be polymerized at a side of the second substrate, wherein an orientation direction of the dichroic pigment in the first polymeric group is perpendicular to an orientation direction of the dichroic pigment in the second polymeric group; and curing the first polymeric group, the second polymeric group, and the dichroic pigment, and sequentially forming a first alignment layer and a first polarizing layer which are laminated at a side of the first substrate near the second substrate, and sequentially forming a second alignment layer and a second polarizing layer which are laminated at a side of the second substrate near the first substrate. By mixing the first polymeric group and the second polymeric group with the liquid crystals, and performing a polymerizing process and a curing process to form the first alignment layer and the second alignment layer, a coating process is omitted. Moreover, a curing temperature of polymeric groups is lower, so that an alignment layer only needs to be processed in a low temperature process, which improves applicability of an alignment process.

DETAILED DESCRIPTION OF PREFERRED EMBODIMENTS

The present disclosure provides a liquid crystal display panel and a manufacturing method thereof, and a manufacturing system. In order to make purposes, technical solutions, and effects of the present disclosure clearer and more definite, the following describes the present disclosure in detail with reference to drawings and examples. It should be understood that specific embodiments described herein are only used to explain the present disclosure, and are not intended to limit the present disclosure.

The present disclosure provides liquid crystal display panel and a manufacturing method thereof, and a manufacturing system to solve the technical problems of high temperature alignment process and complicated processes.

Figure 1:
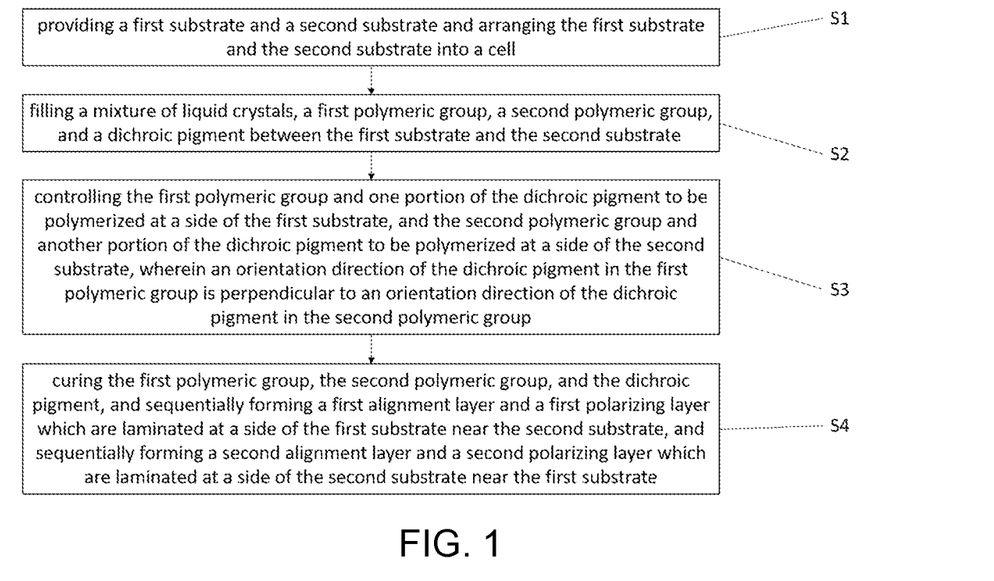
FIG. 1 is a flowchart of a manufacturing method of a liquid crystal display panel provided by an embodiment of the present disclosure.

Shown in FIG. 1 is a flowchart of a manufacturing method of a liquid crystal display panel provided by an embodiment of the present disclosure. The method comprises:

S1: providing a first substrate and a second substrate and arranging the first substrate and the second substrate into a cell.

S2: filling a mixture of liquid crystals, a first polymeric group, a second polymeric group, and a dichroic pigment between the first substrate and the second substrate.

S3: controlling the first polymeric group and one portion of the dichroic pigment to be polymerized at a side of the first substrate, and the second polymeric group and another portion of the dichroic pigment to be polymerized at a side of the second substrate, wherein an orientation direction of the dichroic pigment in the first polymeric group is perpendicular to an orientation direction of the dichroic pigment in the second polymeric group.

S4: curing the first polymeric group, the second polymeric group, and the dichroic pigment, and sequentially forming a first alignment layer and a first polarizing layer which are laminated at a side of the first substrate near the second substrate, and sequentially forming a second alignment layer and a second polarizing layer which are laminated at a side of the second substrate near the first substrate.

The method is described in detail below with reference to FIG. 2 to FIG. 6.

Figure 2:
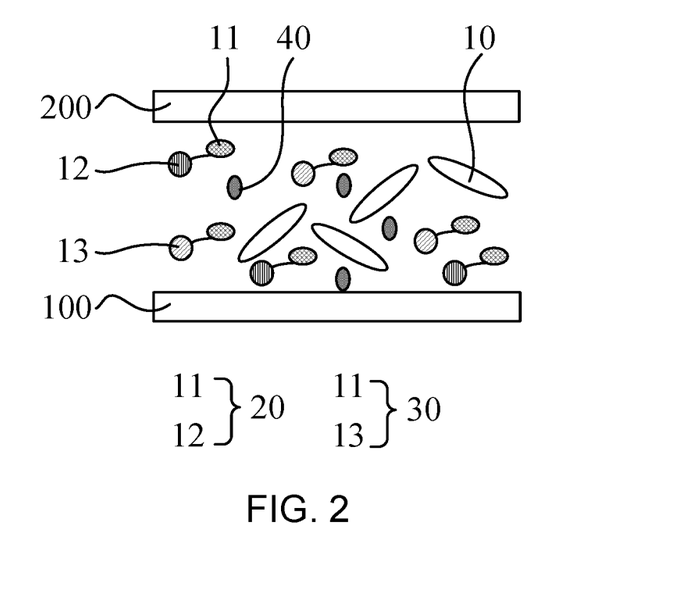
FIG. 2 is a first-level schematic diagram of the manufacturing method of the liquid crystal display panel provided by the embodiment of the present disclosure.

In the step S1, providing the first substrate and the second substrate and arranging the first substrate and the second substrate into a cell. As shown in FIG. 2, the first substrate 100 and the first substrate 200 are arranged into a cell.

In one embodiment, the liquid crystal display panel is a general liquid crystal display panel, the first substrate is an array substrate, and the second substrate is a color film substrate. The first substrate 100 comprises a first base substrate, a thin film transistor layer disposed at a side of the first substrate, and a pixel electrode layer disposed at a side of the thin film transistor layer away from the first base substrate. The second substrate 200 comprises a second base substrate, a black matrix layer, and a color resistance layer disposed at a side of the second base substrate, and a common electrode layer disposed at a side of the black matrix layer and the color resist layer away from the second base substrate.

In one embodiment, the liquid crystal display panel is a color filter on array (COA) liquid crystal display panel. The first substrate 100 comprises a first base substrate, a thin film transistor layer disposed at a side of the first base substrate, a color resistance layer disposed at a side of the thin film transistor layer away from the first base substrate, and a color resistance layer disposed on a side of the thin film transistor layer away from a pixel electrode layer. The second substrate 200 comprises a second base substrate, a black matrix layer disposed at a side of the second base substrate, and a common electrode layer disposed at a side of the black matrix layer away from the second base substrate.

The present disclosure does not limit type of the liquid crystal display panel, and the liquid crystal display panels in the above embodiments can be prepared by using the present method.

In the step S2, filling the mixture of liquid crystals 10, the first polymeric group 20, the second polymeric group 30, and the dichroic pigment 40 between the first substrate 100 and the second substrate 200.

After the first substrate 100 and the second substrate 200 are prepared into a cell, they need to be filled. After filling, the first substrate 100 and the second substrate 200 are pasted with a sealant to form a closed liquid crystal cell. A backlight module is usually disposed at a side of the first substrate 100 away from the second substrate 200. By controlling deflection of the liquid crystals 10 to control whether light emitted by the backlight module passes through, display control of the liquid crystal display panel is achieved. The liquid crystals 10 filled in the first substrate 100 and the second substrate 200 are usually a small molecule nematic phase liquid crystals.

Before filling, the first polymeric group 20 and the second polymeric group 30 are prepared.

Figure 6:
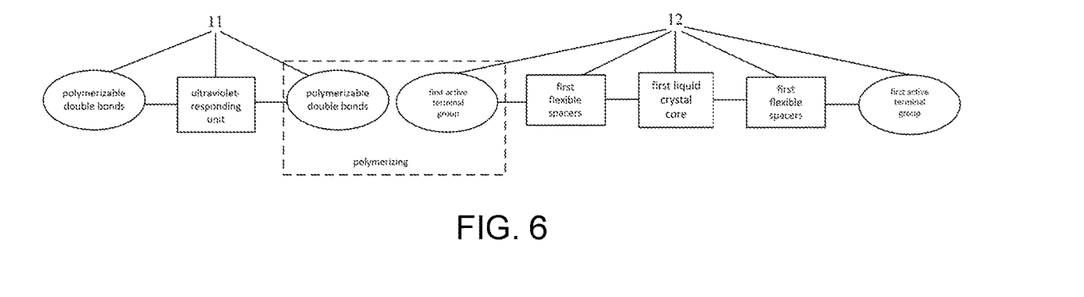
FIG. 6 is a schematic manufacturing diagram of a first polymeric group in the liquid crystal display panel provided by the embodiment of the present disclosure.

The first polymeric group 20 is formed by pre-polymerizing an alignment prepolymer 11 and a first liquid crystal group 12. Shown in FIG. 6 is a schematic manufacturing diagram of the first polymeric group. Wherein, the alignment prepolymer 11 comprises an ultraviolet-responding unit and polymerizable double bonds on both sides. The first liquid crystal group 12 comprises a first liquid crystal core, first flexible spacers on both sides of the first liquid crystal core, and a first active terminal group connected to the first flexible spacers. One of the polymerizable double bonds of the alignment prepolymer 11 and one of the first active terminal groups of the first liquid crystal group 12 undergo a polymerization reaction to form the first polymeric group 20. In one embodiment, the first active terminal group is an acrylate.

The manufacturing method of the second polymeric group 30 is similar to the manufacturing method of the first polymeric group 20. The second polymeric group 30 is formed by pre-polymerizing the alignment prepolymer 11 and a second liquid crystal group 13, wherein the alignment prepolymer 11 comprises the ultraviolet-responding unit and the polymerizable double bonds on both sides, and the second liquid crystal group 13 comprises a second liquid crystal core, second flexible spacers on both sides of the second liquid crystal core, and a second active terminal group connected to the second flexible spacers. One of the polymerizable double bonds of the alignment prepolymer 11 and one of the second active terminal groups of the second liquid crystal group 13 undergo the polymerization reaction to form the second polymeric group 30. In one embodiment, the second active terminal group is an acrylate.

The dichroic pigment 40 comprises a dichroic pigment molecule, and the dichroic pigment molecule has a stick structure.

Figure 3:
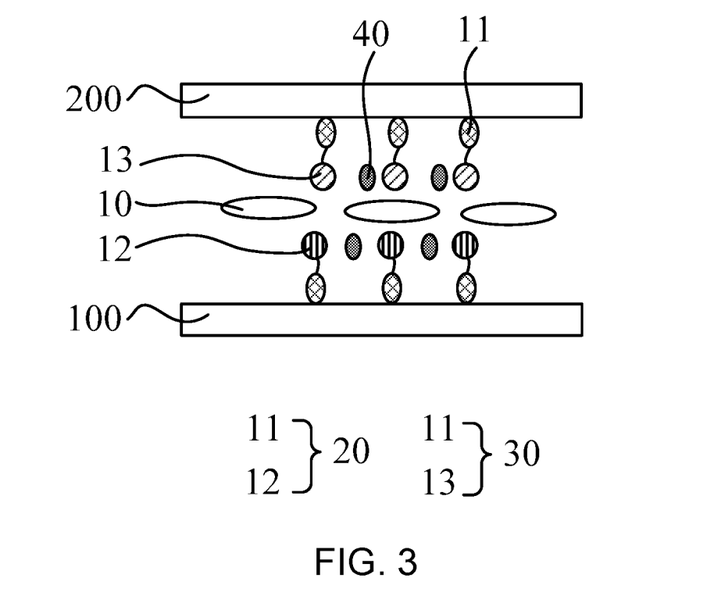
FIG. 3 is a second-level schematic diagram of the manufacturing method of the liquid crystal display panel provided by the embodiment of the present disclosure.

In the step S3, controlling the first polymeric group 20 and one portion of the dichroic pigment 40 to be polymerized at a side of the first substrate 100, and the second polymeric group 30 and another portion of the dichroic pigment 40 to be polymerized at a side of the second substrate 200, wherein the orientation direction of the dichroic pigment 40 in the first polymeric group 20 are perpendicular to the orientation direction of the dichroic pigment in the second polymeric group 30.

Shown in FIG. 3 is adopting a method of applying an electric field to polymerize the first polymeric group 20 and one portion of the dichroic pigment 40 at a side of the first substrate 100, and polymerize the second polymeric group 30 and another portion of the dichroic pigment 40 at a side of the second substrate 200.

In the present disclosure, the alignment prepolymer 11 in the first polymeric group 20 is a self-aligned material, and the self-aligned material is polymerized on a surface of the first substrate 100 and a surface of the second substrate 200 under action of applying an electric field, thereby separating the liquid crystals 10 from the first substrate 100 and the second substrate 200. The first liquid crystal group 12 is also polymerized at a side of the first substrate 100 by the alignment prepolymer 11. In a similar way, the first liquid crystal group 12 in the second polymeric group 30 is also polymerized at a side of the second substrate 200 by the alignment prepolymer 11. One portion of the dichroic pigment 40 is polymerized at a side of the first substrate 100 with the first polymeric group 20, and another portion is polymerized at a side of the second substrate 200 with the second polymeric group 30.

In the present embodiment, polymerization positions of the first polymeric group 20 and the second polymeric group 30 can be controlled by applying a voltage to the pixel electrode in the first substrate 100 and the common electrode in the second substrate 200 to control magnitude of the voltage.

The portion of the dichroic pigment 40 polymerized on the first substrate 100 forms a guest-host relationship with liquid crystal molecules in the first liquid crystal group 12 of the first polymeric group 20; that is, the dichroic pigment 40 is a guest, and the liquid crystal molecules are host. In a similar way, another portion of the dichroic pigment 40 polymerized on the second substrate 200 forms a guest-host relationship with liquid crystal molecules in the second liquid crystal group 13 of the second polymeric group 30. Dichroic dye molecules in the dichroic pigment 40 is a guest and an orientation are affected by the liquid crystal molecules.

In the present embodiment, the first liquid crystal group 12 in the first polymeric group 20 and the second liquid crystal group 13 in the second polymeric group 30 are different liquid crystal structures, so structures of the first polymeric group 20 and the second polymeric group 30 are also different. The liquid crystal molecules have a long-axis direction and a short-axis direction, and the dichroic dye molecules also have a long-axis direction and a short-axis direction. Due to structural difference between the first polymeric group 20 and the second polymeric group 30, an orientation direction of the dichroic dye molecules in the first polymeric group 20 and an orientation direction of the dichroic dye molecules in the second polymeric group 30 are perpendicular to each other.

Figure 4:
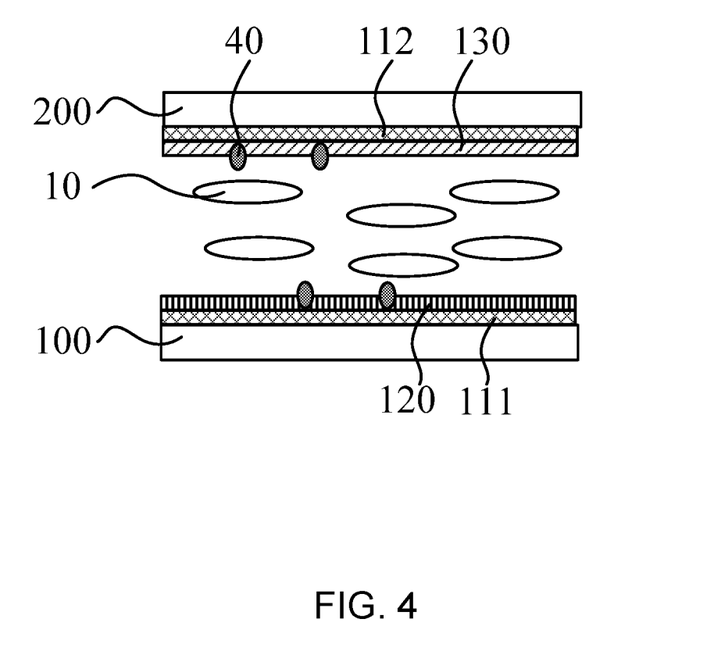
FIG. 4 is a third-level schematic diagram of the manufacturing method of the liquid crystal display panel provided by the embodiment of the present disclosure.

In the step S4, curing the first polymeric group, the second polymeric group, and the dichroic pigment, and sequentially forming a first alignment layer and a first polarizing layer which are laminated at a side of the first substrate near the second substrate, and sequentially forming a second alignment layer and a second polarizing layer which are laminated at a side of the second substrate near the first substrate.

As shown in FIG. 4, the first polymeric group 20, the second polymeric group 30 and the dichroic pigment 40 are cured by heating and ultraviolet irradiation.

The first polymeric group 20 and the portion of the dichroic pigment 40 are cured on the surface of the first substrate 100, so that the alignment prepolymer 11 in the first polymeric group 20 is formed into a first alignment layer 111, and the first liquid crystal group 12 and a portion of the dichroic pigment 40 is formed into a first polarizing layer 120. The second polymeric group 30 and another portion of the dichroic pigment 40 are cured on the surface of the second substrate 200, so that the alignment prepolymer 11 in the second polymeric group 30 is formed into a second alignment layer 112, and the second liquid crystal group 13 and another portion of the dichroic pigment 40 is formed into a second polarizing layer 130.

Since the liquid crystals 10 in the first substrate 100 and the second substrate 200 need to be aligned, the first liquid crystal group 12 in the first polarizing layer 120 and the second liquid crystal group 13 in the second polarizing layer 130 also need to be aligned, after the alignment layer and the polarizing layer are formed, ultraviolet light is irradiated. Therefore, after the first alignment layer 111 and the second alignment layer 112 perform light-controlling alignment, the crystal molecules in the liquid crystals 10, the liquid crystal molecules in the first liquid crystal group 12 in the first polymeric group 20, and the liquid crystal molecules in the second liquid crystal group 13 in the second polymeric group 30 all have same pretilt angle.

Since the dichroic dye molecules in the first polarizing layer 120 and the second polarizing layer 130 have different structures of the first polymeric group 20 and the second polymeric group 30, they have mutually perpendicular orientation directions.

Figure 5:
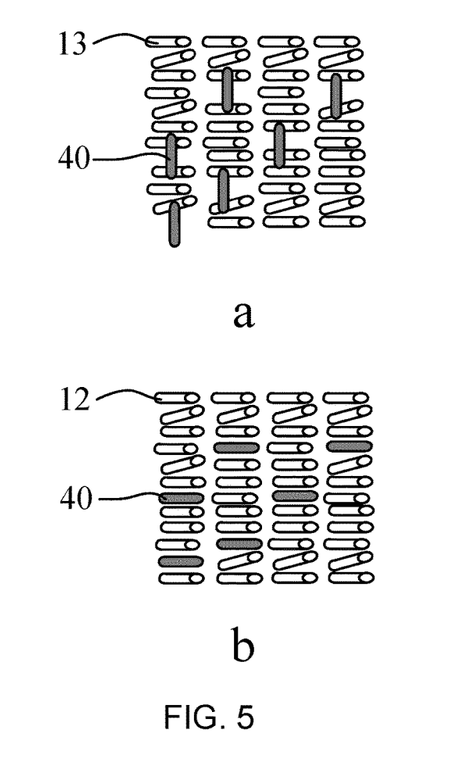
FIG. 5 is a fourth-level schematic diagram of the manufacturing method of the liquid crystal display panel provided by the embodiment of the present disclosure.

As shown in a of FIG. 5, a portion of the dichroic pigment 40 in the second polymeric group 30, a long axis of the dichroic dye molecules is aligned parallel to a short axis of the liquid crystal molecules in the second liquid crystal group 13. As shown in b of FIG. 5, a portion of the dichroic pigment 40 in the first polymeric group 20, and a long axis of the dichroic dye molecules is aligned parallel to a long axis of the liquid crystal molecules in the first liquid crystal group 12. That is, the orientation direction of the dichroic pigment 40 in the first polymeric group 20 is perpendicular to the orientation direction of the dichroic pigment in the second polymeric group 30. When the liquid crystal display panel is energized for display, a polarization direction of transmitted light of the dichroic dye molecules in the first polarizing layer 120 is perpendicular to a deflection direction of transmitted light of the dichroic dye molecules in the second polarizing layer 130, which achieves control of whether the transmitted light passes through.

In the prior art, liquid crystal alignment in liquid crystal display panels is done through coating surfaces of the first substrate 100 and the second substrate 200 in polyimide liquid, and performing a pre-baking process, an ultraviolet irradiation process, and a high temperature curing process, etc., to form an alignment film for alignment. The manufacturing process is more complicated, and a high temperature process is not suitable for some products such as quantum dots that need to be manufactured under a low temperature process. However, in preparation of polarizing plates, a polarizing layer and an alignment film are prepared together, and they are disposed on the surfaces of the first substrate 100 and the second substrate 200 after the alignment process. Therefore, the liquid crystals in the polarizing plate and the liquid crystals between the two substrates are respectively aligned, the processes are complicated, and a high temperature process is required.

In the present disclosure, the first alignment layer, the first polarizing layer, the second alignment layer, and the second polarizing layer are formed by mixing the first polymeric group and the second polymeric group with the liquid crystals, and the polymerizing process and the curing process are performed. An alignment layer is shared by the liquid crystals in the polarizing layer and the liquid crystals between the two substrates, so that a coating process is omitted. Moreover, curing temperature of polymeric groups is lower, so that the alignment layer only needs to be processed at a low temperature process, which improves applicability of the alignment process.

The present disclosure further provides a liquid crystal display panel, and the liquid crystal display panel is formed by using any one of the manufacturing methods of the above embodiments.

The present disclosure further provides a manufacturing system of a liquid crystal display panel comprising an encasing alignment device used to provide a first substrate and a second substrate and arrange the first substrate and the second substrate into a cell; a mixing device used to fill a mixture of liquid crystals, a first polymeric group, a second polymeric group, and a dichroic pigment between the first substrate and the second substrate; a polymerizing device used to control the first polymeric group and one portion of the dichroic pigment to be polymerized at a side of the first substrate, and the second polymeric group and another portion of the dichroic pigment to be polymerized at a side of the second substrate, wherein an orientation direction of the dichroic pigment in the first polymeric group is perpendicular to an orientation direction of the dichroic pigment in the second polymeric group; and a curing device used to cure the first polymeric group, the second polymeric group, and the dichroic pigment, and sequentially forming a first alignment layer and a first polarizing layer which are laminated at a side of the first substrate near the second substrate, and sequentially forming a second alignment layer and a second polarizing layer which are laminated at a side of the second substrate near the first substrate.

In the manufacturing system of the liquid crystal display panel, the manufacturing system further comprises a first pre-polymerizing device used to pre-polymerize an alignment prepolymer and a first liquid crystal group to form the first polymeric group; and a second pre-polymerizing device used to pre-polymerize the alignment prepolymer and a second liquid crystal group to form the second polymeric group.

In the manufacturing system of the liquid crystal display panel, the first pre-polymerizing device comprises a first prepolymer providing element used to provide the alignment prepolymer and the first liquid crystal group, wherein the alignment prepolymer comprises an ultraviolet-responding unit and polymerizable double bonds on both sides, and the first liquid crystal group comprises a first liquid crystal core, first flexible spacers on both sides of the first liquid crystal core, and a first active terminal group connected to the first flexible spacers; and a first prepolymer responding element used to pre-polymerize the polymerizable double bonds with the first active terminal group to form the first polymeric group.

In the manufacturing system of the liquid crystal display panel, the first prepolymer providing element is used to provide the first liquid crystal group having the first active terminal group as an acrylate.

In the manufacturing system of the liquid crystal display panel, the second pre-polymerizing device comprises a second prepolymer providing element used to provide the alignment prepolymer and the second liquid crystal group, wherein the alignment prepolymer comprises the ultraviolet-responding unit and the polymerizable double bonds on both sides, and the second liquid crystal group comprises a second liquid crystal core, second flexible spacers on both sides of the second liquid crystal core, and a second active terminal group connected to the second flexible spacers; and a second prepolymer responding element used to pre-polymerize the polymerizable double bonds with the second active terminal group to form the second polymeric group.

In the manufacturing system of the liquid crystal display panel, the second prepolymer providing element is used to provide the second liquid crystal group having the second active terminal group as an acrylate.

In the manufacturing system of the liquid crystal display panel, the polymerizing device is used to apply an electric field to the mixture to control the first polymeric group, the second polymeric group, and the dichroic pigment to be polymerized.

In the manufacturing system of the liquid crystal display panel, the polymerizing device is used to apply a voltage to a pixel electrode in the first substrate and a common electrode in the second substrate.

In the manufacturing system of the liquid crystal display panel, the curing device is used to heat and irradiate with ultraviolet light on the first polymeric group, the second polymeric group, and the dichroic pigment.

In the manufacturing system of the liquid crystal display panel, the curing device comprises a first curing element used to cure the first polymeric group and one portion of the dichroic pigment, so that the first alignment layer is formed by the alignment prepolymer in the first polymeric group, and the first polarizing layer is formed by the first polymeric group and one portion of the dichroic pigment; and a second curing element used to cure the second polymeric group and the other portion of the dichroic pigment, so that the second alignment layer is formed by the alignment prepolymer in the second polymeric group, and the second polarizing layer is formed by the second polymeric group and the other portion of the dichroic pigment.

The present disclosure provides a liquid crystal display panel and a manufacturing method thereof, and a manufacturing system. The method comprises providing a first substrate and a second substrate and arranging the first substrate and the second substrate into a cell; filling a mixture of liquid crystals, a first polymeric group, a second polymeric group, and a dichroic pigment between the first substrate and the second substrate; controlling the first polymeric group and one portion of the dichroic pigment to be polymerized at a side of the first substrate, and the second polymeric group and another portion of the dichroic pigment to be polymerized at a side of the second substrate, wherein an orientation direction of the dichroic pigment in the first polymeric group is perpendicular to an orientation direction of the dichroic pigment in the second polymeric group; and curing the first polymeric group, the second polymeric group, and the dichroic pigment, and sequentially forming a first alignment layer and a first polarizing layer which are laminated at a side of the first substrate near the second substrate, and sequentially forming a second alignment layer and a second polarizing layer which are laminated at a side of the second substrate near the first substrate. By mixing the first polymeric group and the second polymeric group with the liquid crystals, and performing a polymerizing process and a curing process to form the first alignment layer and the second alignment layer, a coating process is omitted. Moreover, a curing temperature of polymeric groups is lower, so that an alignment layer only needs to be processed in a low temperature process, which improves applicability of an alignment process.

In the above embodiments, description of each embodiment has its own emphasis. For a part that is not described in detail in an embodiment, refer to the description of other embodiments.

A liquid crystal display panel and a manufacturing method thereof, and a manufacturing system provided by the embodiments of the present disclosure have been described in detail above. The present disclosure uses specific examples to describe principles and embodiments of the present disclosure. The descriptions of the above embodiments are only used to help understand technical solutions of the present disclosure and core ideas thereof. Moreover, those of ordinary skill in the art should understand that the technical solutions described in the aforesaid embodiments can still be modified, or have some technical features equivalently replaced. However, these modifications or replacements do not depart from a scope of the technical solutions of the embodiments of the present disclosure.

What is claimed is:

1. A manufacturing method of a liquid crystal display panel, comprising following steps:

providing a first substrate and a second substrate and arranging the first substrate and the second substrate into a cell;

filling a mixture of liquid crystals, a first polymeric group, a second polymeric group, and a dichroic pigment between the first substrate and the second substrate;

controlling the first polymeric group and one portion of the dichroic pigment to be polymerized at a side of the first substrate, and the second polymeric group and another portion of the dichroic pigment to be polymerized at a side of the second substrate, wherein an orientation direction of the dichroic pigment in the first polymeric group is perpendicular to an orientation direction of the dichroic pigment in the second polymeric group; and curing the first polymeric group, the second polymeric group, and the dichroic pigment, to form a first alignment layer and a first polarizing layer which are laminated at a side of the first substrate near the second substrate, and to form a second alignment layer and a second polarizing layer which are laminated at a side of the second substrate near the first substrate.

2. The manufacturing method of the liquid crystal display panel as claimed in claim 1, wherein before the step of filling the mixture of liquid crystals, the first polymeric group, the second polymeric group, and the dichroic pigment between the first substrate and the second substrate, the manufacturing method comprises:

pre-polymerizing an alignment prepolymer and a first liquid crystal group to form the first polymeric group; and pre-polymerizing the alignment prepolymer and a second liquid crystal group to form the second polymeric group.

3. The manufacturing method of the liquid crystal display panel as claimed in claim 2, wherein the step of pre-polymerizing the alignment prepolymer and the first liquid crystal group to form the first polymeric group comprises:

providing the alignment prepolymer and the first liquid crystal group, wherein the alignment prepolymer comprises an ultraviolet-responding unit and polymerizable double bonds on both sides, and the first liquid crystal group comprises a first liquid crystal core, first flexible spacers on both sides of the first liquid crystal core, and a first active terminal group connected to the first flexible spacers; and pre-polymerizing the polymerizable double bonds with the first active terminal group to form the first polymeric group.

4. The manufacturing method of the liquid crystal display panel as claimed in claim 3, wherein the step of providing the alignment prepolymer and the first liquid crystal group, wherein the alignment prepolymer comprises an ultraviolet-responding unit and polymerizable double bonds on both sides, and the first liquid crystal group comprises the first liquid crystal core, the first flexible spacers on both sides of the first liquid crystal core, and the first active terminal group connected to the first flexible spacers comprises:

providing the first liquid crystal group having the first active terminal group as an acrylate.

5. The manufacturing method of the liquid crystal display panel as claimed in claim 3, wherein the step of pre-polymerizing the alignment prepolymer and the second liquid crystal group to form the second polymeric group comprises:

providing the alignment prepolymer and the second liquid crystal group, wherein the alignment prepolymer comprises the ultraviolet-responding unit and the polymerizable double bonds on both sides, and the second liquid crystal group comprises a second liquid crystal core, second flexible spacers on both sides of the second liquid crystal core, and a second active terminal group connected to the second flexible spacers; and pre-polymerizing the polymerizable double bonds with the second active terminal group to form the second polymeric group.

6. The manufacturing method of the liquid crystal display panel as claimed in claim 5, wherein the step of providing the alignment prepolymer and the second liquid crystal group, wherein the alignment prepolymer comprises the ultraviolet-responding unit and the polymerizable double bonds on both sides, and the second liquid crystal group comprises the second liquid crystal core, the second flexible spacers on both sides of the second liquid crystal core, and the second active terminal group connected to the second flexible spacers comprises:

providing the second liquid crystal group having the second active terminal group as an acrylate.

7. The manufacturing method of the liquid crystal display panel as claimed in claim 5, wherein the step of controlling the first polymeric group and the one portion of the dichroic pigment to be polymerized at the side of the first substrate, and the second polymeric group and the other portion of the dichroic pigment to be polymerized at the side of the second substrate comprises:

applying an electric field to the mixture to control the first polymeric group, the second polymeric group, and the dichroic pigment to be polymerized.

8. The manufacturing method of the liquid crystal display panel as claimed in claim 5, wherein the step of curing the first polymeric group, the second polymeric group, and the dichroic pigment, sequentially forming the first alignment layer and the first polarizing layer which are laminated at the side of the first substrate near the second substrate, and sequentially forming the second alignment layer and the second polarizing layer which are laminated at the side of the second substrate near the first substrate comprises:

heating and irradiating with ultraviolet light on the first polymeric group, the second polymeric group, and the dichroic pigment.

9. The manufacturing method of the liquid crystal display panel as claimed in claim 8, wherein the step of curing the first polymeric group, the second polymeric group, and the dichroic pigment, sequentially forming the first alignment layer and the first polarizing layer which are laminated at the side of the first substrate near the second substrate, and sequentially forming the second alignment layer and the second polarizing layer which are laminated at the side of the second substrate near the first substrate comprises:

curing the first polymeric group and one portion of the dichroic pigment, so that the first alignment layer is formed by the alignment prepolymer in the first polymeric group, and the first polarizing layer is formed by the first polymeric group and one portion of the dichroic pigment; and curing the second polymeric group and the other portion of the dichroic pigment, so that the second alignment layer is formed by the alignment prepolymer in the second polymeric group, and the second polarizing layer is formed by the second polymeric group and the other portion of the dichroic pigment.

10. The liquid crystal display panel as manufactured by using the manufacturing method claimed in claim 1.

11. A manufacturing system of a liquid crystal display panel, comprising:

an encasing alignment device used to provide a first substrate and a second substrate and arrange the first substrate and the second substrate into a cell;

a mixing device used to fill a mixture of liquid crystals, a first polymeric group, a second polymeric group, and a dichroic pigment between the first substrate and the second substrate;

a polymerizing device used to control the first polymeric group and one portion of the dichroic pigment to be polymerized at a side of the first substrate, and the second polymeric group and another portion of the dichroic pigment to be polymerized at a side of the second substrate, wherein an orientation direction of the dichroic pigment in the first polymeric group is perpendicular to an orientation direction of the dichroic pigment in the second polymeric group; and a curing device used to cure the first polymeric group, the second polymeric group, and the dichroic pigment, to form a first alignment layer and a first polarizing layer which are laminated at a side of the first substrate near the second substrate, and to form a second alignment layer and a second polarizing layer which are laminated at a side of the second substrate near the first substrate.

12. The manufacturing system of the liquid crystal display panel as claimed in claim 11, wherein the manufacturing system comprises:

a first pre-polymerizing device used to pre-polymerize an alignment prepolymer and a first liquid crystal group to form the first polymeric group; and a second pre-polymerizing device used to pre-polymerize the alignment prepolymer and a second liquid crystal group to form the second polymeric group.

13. The manufacturing system of the liquid crystal display panel as claimed in claim 12, wherein the first pre-polymerizing device comprises:

a first prepolymer providing element used to provide the alignment prepolymer and the first liquid crystal group, wherein the alignment prepolymer comprises an ultraviolet-responding unit and polymerizable double bonds on both sides, and the first liquid crystal group comprises a first liquid crystal core, first flexible spacers on both sides of the first liquid crystal core, and a first active terminal group connected to the first flexible spacers; and a first prepolymer responding element used to pre-polymerize the polymerizable double bonds with the first active terminal group to form the first polymeric group.

14. The manufacturing system of the liquid crystal display panel as claimed in claim 13, wherein the first prepolymer providing element is used to provide the first liquid crystal group having the first active terminal group as an acrylate.

15. The manufacturing system of the liquid crystal display panel as claimed in claim 13, wherein the second pre-polymerizing device comprises:

a second prepolymer providing element used to provide the alignment prepolymer and the second liquid crystal group, wherein the alignment prepolymer comprises the ultraviolet-responding unit and the polymerizable double bonds on both sides, and the second liquid crystal group comprises a second liquid crystal core, second flexible spacers on both sides of the second liquid crystal core, and a second active terminal group connected to the second flexible spacers; and a second prepolymer responding element used to prepolymerize the polymerizable double bonds with the second active terminal group to form the second polymeric group.

16. The manufacturing system of the liquid crystal display panel as claimed in claim 15, wherein the second prepolymer providing element is used to provide the second liquid crystal group having the second active terminal group as an acrylate.

17. The manufacturing system of the liquid crystal display panel as claimed in claim 15, wherein the polymerizing device is used to apply an electric field to the mixture to control the first polymeric group, the second polymeric group, and the dichroic pigment to be polymerized.

18. The manufacturing system of the liquid crystal display panel as claimed in claim 17, wherein the polymerizing device is used to apply a voltage to a pixel electrode in the first substrate and a common electrode in the second substrate.

19. The manufacturing system of the liquid crystal display panel as claimed in claim 15, wherein the curing device is used to heat and irradiate with ultraviolet light on the first polymeric group, the second polymeric group, and the dichroic pigment.

20. The manufacturing system of the liquid crystal display panel as claimed in claim 19, wherein the curing device comprises:
   a first curing element used to cure the first polymeric group and the one portion of the dichroic pigment, so that the first alignment layer is formed by the alignment prepolymer in the first polymeric group, and the first polarizing layer is formed by the first polymeric group and the one portion of the dichroic pigment; and
   a second curing element used to cure the second polymeric group and the other portion of the dichroic pigment, so that the second alignment layer is formed by the alignment prepolymer in the second polymeric group, and the second polarizing layer is formed by the second polymeric group and the other portion of the dichroic pigment.

* * * * *